United States Patent
Okugami et al.

(10) Patent No.: US 7,682,087 B2
(45) Date of Patent: Mar. 23, 2010

(54) TRANSMISSION COMPONENT, METHOD OF MANUFACTURING THE SAME, AND TAPERED ROLLER BEARING

(75) Inventors: Kouichi Okugami, Iwata (JP); Yoshinori Muramatsu, Iwata (JP); Chikara Ohki, Kuwana (JP); Michio Hori, Kuwana (JP)

(73) Assignee: NTN Corporation, Osaka (JP)

( * ) Notice: Subject to any disclaimer, the term of this patent is extended or adjusted under 35 U.S.C. 154(b) by 300 days.

(21) Appl. No.: 10/787,221

(22) Filed: Feb. 27, 2004

(65) Prior Publication Data
US 2004/0170348 A1 Sep. 2, 2004

(30) Foreign Application Priority Data
Feb. 28, 2003 (JP) ............................. 2003-053748
Jan. 30, 2004 (JP) ............................. 2004-024096

(51) Int. Cl.
*F16C 33/58* (2006.01)
*F16C 33/00* (2006.01)

(52) U.S. Cl. ...................................... 384/569; 384/625
(58) Field of Classification Search ................. 384/492, 384/625, 912
See application file for complete search history.

(56) References Cited

U.S. PATENT DOCUMENTS

| | | | |
|---|---|---|---|
| 3,954,517 A | 5/1976 | Jatczak et al. | |
| 4,162,419 A | 7/1979 | DeAngelis | |
| 4,930,909 A | 6/1990 | Murakami et al. | |
| 4,971,634 A | 11/1990 | Shibata et al. | |
| 5,085,733 A | 2/1992 | Mitamura | |
| 5,129,966 A | 7/1992 | Rao | |
| 5,137,375 A * | 8/1992 | Murakami et al. | .......... 384/450 |
| 5,180,450 A | 1/1993 | Rao | |
| 5,338,377 A | 8/1994 | Mitamura et al. | |
| 5,352,303 A | 10/1994 | Murakami et al. | |
| 5,375,323 A | 12/1994 | Sata | |
| 5,413,643 A | 5/1995 | Murakami et al. | |
| 5,427,457 A | 6/1995 | Furumura et al. | |
| 5,427,600 A | 6/1995 | Itoh et al. | |

(Continued)

FOREIGN PATENT DOCUMENTS

CN     1344932 A     4/2002

(Continued)

OTHER PUBLICATIONS

Japanese Office Action issued in Japanese Patent Application No. JP 2002-303036, dated Oct. 24, 2006.

(Continued)

*Primary Examiner*—Thomas R Hannon
*Assistant Examiner*—Justin Krause
(74) *Attorney, Agent, or Firm*—McDermott Will & Emery LLP

(57) ABSTRACT

A transmission component is incorporated into a transmission in which an input shaft, an output shaft, or a gear is rotatably supported by a rolling bearing. The component has a nitriding layer at a surface layer and an austenite grain with a grain size number falling within a range exceeding 10. This provides a transmission component having an increased anti-crack strength, enhanced dimensional stability, and a long fatigue life. A method of manufacturing such a transmission component and a tapered roller bearing are also provided.

6 Claims, 13 Drawing Sheets

U.S. PATENT DOCUMENTS

| | | |
|---|---|---|
| 5,456,136 A | 10/1995 | Yamashita et al. |
| 5,456,766 A | 10/1995 | Beswick et al. |
| 5,595,610 A | 1/1997 | Maeda et al. |
| 5,611,250 A | 3/1997 | Narai et al. |
| 5,658,082 A | 8/1997 | Tsushima et al. |
| 5,733,667 A | 3/1998 | Nakasuji et al. |
| 5,772,956 A | 6/1998 | Hasegawa et al. |
| 5,775,280 A | 7/1998 | Schmidt et al. |
| 5,792,286 A | 8/1998 | Inoue et al. |
| 5,803,993 A | 9/1998 | Yoshida et al. |
| 5,848,846 A | 12/1998 | Sugiyama et al. |
| 5,853,249 A | 12/1998 | Maeda et al. |
| 5,944,916 A | 8/1999 | Chung |
| 5,972,130 A | 10/1999 | Underys et al. |
| 5,979,383 A | 11/1999 | Faville et al. |
| 6,012,851 A | 1/2000 | Hirakawa et al. |
| 6,086,686 A | 7/2000 | Tanaka et al. |
| 6,095,692 A | 8/2000 | Takemura |
| 6,149,734 A | 11/2000 | Isogai et al. |
| 6,158,263 A | 12/2000 | Maeda et al. |
| 6,165,289 A | 12/2000 | Matsumoto et al. |
| 6,224,688 B1 * | 5/2001 | Takemura et al. ............ 148/318 |
| 6,251,198 B1 | 6/2001 | Koo et al. |
| 6,258,179 B1 | 7/2001 | Takayama et al. |
| 6,290,398 B1 | 9/2001 | Fujiwara et al. |
| 6,306,227 B2 | 10/2001 | Okayama et al. |
| 6,309,475 B1 | 10/2001 | Takayama et al. |
| 6,328,009 B1 | 12/2001 | Brothers |
| 6,342,109 B1 | 1/2002 | Takemura et al. |
| 6,423,158 B1 * | 7/2002 | Maeda et al. ................ 148/319 |
| 6,440,232 B1 * | 8/2002 | Takemura et al. ............ 148/319 |
| 6,447,619 B1 | 9/2002 | Takayama et al. |
| 6,488,789 B2 | 12/2002 | Tajima et al. |
| 6,532,920 B1 | 3/2003 | Sweetnam et al. |
| 6,582,532 B1 | 6/2003 | Kurebayashi et al. |
| 6,602,358 B1 * | 8/2003 | Ochi et al. .................. 148/328 |
| 6,641,680 B2 * | 11/2003 | Nishimori et al. ............ 148/229 |
| 6,699,335 B2 | 3/2004 | Murakami et al. |
| 6,855,217 B2 * | 2/2005 | Suzuki ........................ 148/567 |
| 7,147,382 B2 | 12/2006 | Suzuki et al. |
| 2002/0043111 A1 | 4/2002 | Takagi et al. |
| 2002/0082133 A1 | 6/2002 | Yoshikawa et al. |
| 2002/0088511 A1 * | 7/2002 | Nakamura et al. .......... 148/541 |
| 2002/0159905 A1 | 10/2002 | Bachmann et al. |
| 2003/0037635 A1 | 2/2003 | Tsuchiyama et al. |
| 2003/0040401 A1 | 2/2003 | Okita et al. |
| 2003/0063829 A1 | 4/2003 | Tamada et al. |
| 2003/0075244 A1 | 4/2003 | Kurebayashi et al. |
| 2003/0123769 A1 * | 7/2003 | Ohki ......................... 384/492 |
| 2004/0079310 A1 * | 4/2004 | Suzuki et al. ............ 123/90.41 |
| 2004/0170348 A1 | 9/2004 | Okugami et al. |
| 2004/0170761 A1 | 9/2004 | Li et al. |
| 2004/0179761 A1 | 9/2004 | Ohki et al. |
| 2004/0228561 A1 | 11/2004 | Okugami et al. |
| 2005/0045247 A1 | 3/2005 | Ohki |
| 2005/0109308 A1 | 5/2005 | Suzuki et al. |
| 2005/0205163 A1 | 9/2005 | Ohki |
| 2007/0034301 A1 | 2/2007 | Hasegawa et al. |
| 2007/0151633 A1 | 7/2007 | Ohki et al. |
| 2007/0169850 A1 | 7/2007 | Ohki et al. |

FOREIGN PATENT DOCUMENTS

| | | |
|---|---|---|
| CN | 1351694 A | 5/2002 |
| CN | 1421541 | 6/2003 |
| DE | 42 04 982 A1 | 8/1993 |
| DE | 19960803 | 6/2000 |
| DE | 10254635 | 6/2003 |
| EP | 0458646 | 11/1991 |
| EP | 0 600 421 A1 | 6/1994 |
| EP | 0626468 | 11/1994 |
| EP | 0723034 | 7/1996 |
| EP | 0 811 789 A1 | 12/1997 |
| EP | 0811789 | 12/1997 |
| EP | 0 950 723 A1 | 10/1999 |
| EP | 0950723 | 10/1999 |
| EP | 1 070 760 A2 | 1/2001 |
| EP | 1158064 | 11/2001 |
| EP | 1184657 A2 | 3/2002 |
| EP | 1273672 | 1/2003 |
| EP | 1 411 142 A1 | 4/2004 |
| FR | 2 841 907 | 1/2004 |
| GB | 2 258 274 A | 2/1993 |
| GB | 2258274 | 2/1993 |
| JP | 48-028308 | 4/1973 |
| JP | 63-185917 | 8/1988 |
| JP | 63-185917 | 11/1988 |
| JP | 2-125841 A | 5/1990 |
| JP | 2-190615 | 7/1990 |
| JP | 03-116706 | 12/1991 |
| JP | 4-254574 | 9/1992 |
| JP | 05-009584 | 1/1993 |
| JP | 05-118336 | 5/1993 |
| JP | 5-163563 A | 6/1993 |
| JP | 05-179350 | 7/1993 |
| JP | 5-179350 | 7/1993 |
| JP | 5-263091 | 10/1993 |
| JP | 6-101424 | 4/1994 |
| JP | 6-117438 | 4/1994 |
| JP | 06-117438 | 4/1994 |
| JP | 6-247253 | 9/1994 |
| JP | 6-286577 | 10/1994 |
| JP | 06-341441 | 12/1994 |
| JP | 7-27139 A | 1/1995 |
| JP | 8-4774 | 1/1996 |
| JP | 8-49057 A | 2/1996 |
| JP | 08-233070 | 9/1996 |
| JP | 08-311603 | 11/1996 |
| JP | 09-053148 | 2/1997 |
| JP | 9-053148 | 2/1997 |
| JP | 9-176740 | 7/1997 |
| JP | 09-176740 | 7/1997 |
| JP | 9-316601 A | 12/1997 |
| JP | 9-329139 | 12/1997 |
| JP | 10-030150 | 2/1998 |
| JP | 10-047334 | 2/1998 |
| JP | 10-68419 A | 3/1998 |
| JP | 10-103339 | 4/1998 |
| JP | 10-110720 | 4/1998 |
| JP | 10-168515 A | 6/1998 |
| JP | 10-184701 | 7/1998 |
| JP | 10-204612 A | 8/1998 |
| JP | 10-231908 | 9/1998 |
| JP | 11-080897 | 3/1999 |
| JP | 11-101247 | 4/1999 |
| JP | 11-140543 A | 5/1999 |
| JP | 11-303874 | 11/1999 |
| JP | 2000-038906 | 2/2000 |
| JP | 2000-038907 | 2/2000 |
| JP | 2000-54810 | 2/2000 |
| JP | 2000-129347 A | 5/2000 |
| JP | 2000-205284 | 7/2000 |
| JP | 2000-212721 | 8/2000 |
| JP | 2001-123244 | 5/2001 |
| JP | 2001-200314 | 7/2001 |
| JP | 2002-031212 | 1/2002 |
| JP | 2002-070872 | 3/2002 |
| JP | 2002-120508 | 4/2002 |
| JP | 2002-180203 A | 6/2002 |
| JP | 2002-194438 | 7/2002 |
| JP | 2002-256336 A | 9/2002 |
| JP | 2002-339054 A | 11/2002 |
| JP | 2003-56315 | 2/2003 |
| JP | 2003-083337 | 3/2003 |

| | | |
|---|---|---|
| JP | 2003-083339 | 3/2003 |
| JP | 2003-156050 | 5/2003 |
| JP | 2003-226918 | 8/2003 |
| JP | 2003-226919 | 8/2003 |
| JP | 2003-287035 | 10/2003 |
| JP | 2003-294034 | 10/2003 |
| WO | WO 91/00929 | 1/1991 |
| WO | WO 02/40730 A1 | 5/2002 |

OTHER PUBLICATIONS

Japanese Office Action with English translation issued in corresponding Japanese Patent Application No. 2002-194804, mailed Mar. 20, 2007.
Japanese Office Action issued in corresponding Japanese Patent Application No. 2003-209737, dated Feb. 6, 2007.
Kim, C., et al., "Influence of Subzero and Shot-Peening Treatments on Impact and Fatigue Fracture Properties of Case-Hardened Steels", Jun. 1981, pp. 43-53, v 2, CSA.
Burrier Jr., H., "Hardenability of Carbon and Low-Alloy Steels", 2002, ASM International.
Vander Voort, "Embrittlement of Steels", 20002, ASM International.
"Method of Impact Test for Metallic Materials", Japanese Industrial Standard JIS Z 2242, Nov. 1999, pp. 1-7, Japanese Standards Association, Tokyo, Japan.
"Test Pieces for Impact Test for Metallic Materials", Japanese Industrial Standard JIS Z 2202, Jul. 1998, pp. 1-3, Japanese Standards Association, Tokyo, Japan.
"Methods of Austenite Grain Size Determination for Steel", Japanese Industrial Standard JIS G 0551, Jun. 1998, pp. 1-25, Japanese Standards Association, Tokyo, Japan.
Japanese Office Action issued in Japanese Patent Application No. 2002-194804, dated Nov. 28, 2006.
Japanese Office Action issued in Japanese Patent Application No. JP 2002-194921, dated Nov. 28, 2006.
Japanese Office Action issued in Japanese Patent Application No. JP 2002-303036, dated Oct. 24, 2006.
Office Action dated Apr. 18, 2007.
US Office Action issued in U.S. Appl. No. 10/686,766, dated on Nov. 7, 2007.
Japanese Office Action, with English translation, issued in Japanese Patent Application No. JP 2002-194775, mailed Mar. 22, 2006.
Japanese Office Action, with English translation, issued in Japanese Patent Application No. JP 2002-194793, mailed Mar. 22, 2006.
European Search Report issued in European Patent Application No. EP 05 70 3409, mailed Apr. 4, 2007.
Chinese Office Action, with English translation, issued in Chinese Patent Application No. CN 200410008248.9, mailed Apr. 27, 2007.
Burrier, Jr., H., "Hardenability of Carbon and Low-Alloy Steels", 2002, ASM International.

Vander Voort, G., "Embrittlement of Steels", 2002 ASM International.
Kim, C., et al., "Influence of Subzero and Shot-Peening Treatments on Impact and Fatigue Fracture Properties of Case-Hardened Steels", J. Heat Treat., Jun. 1981, pp. 43-53, vol. 2 No. 1.
Annual Book of ASTM Standards Section Three Metals Test Methods and Analytical Procedures, 2003, vol. 03.01, ASTM International Standards Worldwide.
"Methods of austenite grain size determination for steel", 1998, Japanese Industrial Standard JIS G 0551, Japanese Standards Association, Tokyo Japan.
"Method of impact test for metallic materials", 1998, Japanese Industrial Standard JIS Z 2242, Japanese Standards Association, Tokyo Japan.
"Test pieces for impact test for metallic materials", 1998, Japanese Inudstrial Standard JIS Z 2202, Japanese Standards Association, Tokyo Japan.
Japanese Office Action, with English translation, issued in Japanese Patent Application No. JP 2002-194804, mailed Mar. 20, 2007.
Japanese Office Action, with English translation, issued in Japanese Patent Application No. JP 2002-303036, mailed Apr. 25, 2006.
Japanese Office Action, with English translation, issued in Japanese Patent Application No. JP 2004-053995 dated on Jun. 17, 2008.
European Search Report issued in European Patent Application No. EP 04807374.6 dated Dec. 18, 2008.
U.S. Office Action issued in U.S. Appl. No. 10/585,646 dated Jan. 16, 2009.
Chinese Office Action, w/ English translation thereof, issued in Chinese Patent Application No. CN 200710146997.1 dated Dec. 26, 2008.
Chinese Office Action, with English translation, issued in Chinese Patent Application No. CN 200710146996.7, mailed Feb. 6, 2009.
Japanese Notice of Grounds of Rejection, w/ English translation thereof, issued in Japanese Patent Application No. JP 2006-139254 dated May 26, 2009.
United States Office Action issued in U.S. Appl. No. 10/897,016 dated May 27, 2009.
United States Office Action issued in U.S. Appl. No. 10/795,389 dated Jul. 29, 2009.
United States Office Action issued in U.S. Appl. No. 11/501,816 dated Aug. 11, 2009.
Chinese Office Action, with English translation, issued in Chinese Patent Application No. CN 200610004620.8, mailed Sep. 5, 2008.
"Technical Means for Improvement of Service Life of a Rolling Bearing", Bearing, 2001, pp. 1,2,5 and 45, No. 5, and partial English translation.
Metallic Material Refining Technology, May 1995, p. 47, and partial English translation.

* cited by examiner

US 7,682,087 B2

TRANSMISSION COMPONENT, METHOD OF MANUFACTURING THE SAME, AND TAPERED ROLLER BEARING

BACKGROUND OF THE INVENTION

1. Field of the Invention

The present invention relates to a transmission component having a long rolling contact fatigue life, an increased anti-crack strength, or a reduced secular variation in dimension, and to a method of manufacturing the same and a tapered roller bearing.

2. Description of the Background Art

To increase a bearing's components in life, a thermal treatment is performed. Specifically, for example, in quenching the components they are heated in an ambient RX gas with ammonium gas further introduced therein to carbo-nitride their surface layer portion, for example as disclosed in Japanese Patent Laying-Open Nos. 8-4774 and 11-101247. This carbonitriding process can harden the surface layer portion and generate retained austenite in a microstructure to provide increased rolling contact fatigue life.

The above-mentioned carbonitriding process is a process to diffuse carbon and nitrogen. This requires a high temperature maintained for a long period of time. As such, for example a coarsened structure results and increased anti-crack strength is hardly obtained. Furthermore, as more austenite is retained, secular dimensional variation rate increases, which is also a problem in this carbonitriding process.

Against rolling fatigue, an increased life can be ensured, an enhanced anti-crack strength provided and an increased secular dimensional variation avoided by relying on designing a steel alloy to provide an adjusted composition. Relying on designing the alloy, however, increases source material cost disadvantageously.

Future bearings in a transmission will be used in environments exerting large loads at high temperatures. In addition, they will be required to be employed in a downsized transmission. Therefore, the bearings will be required to be operable under larger loads at higher temperatures than conventional. As such, there is a demand for a bearing having large strength, long life against rolling contact fatigue, and large anti-crack strength and dimensional stability.

SUMMARY OF THE INVENTION

It is an object of the present invention to provide a transmission component having an increased anti-crack strength, an enhanced dimensional stability, and a long fatigue life (or a long rolling contact fatigue life in the case of a tapered roller bearing or when the component is a rolling bearing or a rolling bearing's component), and a method of manufacturing the same and a tapered roller bearing.

The present invention provides a transmission component incorporated into a transmission capable of changing a rotational speed of an output shaft relative to a rotational speed of an input shaft by means of mesh of toothed wheels. The component has a nitriding layer at a surface layer and an austenite grain with a grain size number falling within a range exceeding 10.

In the transmission component according to the present invention, a small austenite grain size allows significantly increased anti-crack strength, dimensional stability and fatigue life (or rolling contact fatigue life when the component is a rolling bearing or a rolling bearing's component). With the austenite grain size number of 10 or less, any remarkable improvement of the fatigue life is impossible and thus the grain size number is greater than 10, and preferably 11 or greater. Although further finer austenite grains are desirable, the grain size number exceeding 13 is usually difficult to achieve. Note that an austenite grain of the transmission component does not vary whether it may be in a surface layer portion significantly affected as it is carbonitrided or a portion inner than the surface layer portion. As such, the surface layer portion and the inner portion will be set as positions serving as subjects of the aforementioned grain number range.

The present invention provides another transmission component incorporated into a transmission capable of changing a rotational speed of an output shaft relative to a rotational speed of an input shaft by means of mesh of toothed wheels. The component has a nitriding layer at a surface layer and a fracture stress value of at least 2650 MPa.

The present inventors have found that steel that is carbonitrided at a temperature exceeding an $A_1$ transformation point and then cooled to a temperature of less than the $A_1$ transformation point, and subsequently reheated to a range of temperature higher than the $A_1$ transformation point and is quenched, can be provided with a nitriding layer allowing the steel to provide a fracture stress value of no less than 2650 MPa, which has conventionally not been achieved. A transmission component superior in fracture stress to conventional and thereby larger in strength can thus be obtained.

The present invention provides a further transmission component incorporated into a transmission capable of changing a rotational speed of an output shaft relative to a rotational speed of an input shaft by means of mesh of toothed wheels. The component has a nitriding layer at a surface layer and a hydrogen content of at most 0.5 ppm.

In the still another transmission component according to the present invention, embrittlement of steel attributed to hydrogen can be alleviated. If steel has a hydrogen content exceeding 0.5 ppm the steel has reduced anti-crack strength. Such a steel is insufficiently suitable for a support structure for a hub experiencing heavy loads. A lower hydrogen content is desirable. However, reduction of the hydrogen content to the one less than 0.3 ppm requires long-term heat treatment, resulting in increase in size of austenite grains and thus deterioration in toughness. Then, a hydrogen content is desirably in a range from 0.3 to 0.5 ppm and more desirably in a range from 0.35 to 0.45 ppm.

In measuring the above hydrogen content, diffusible hydrogen is not measured and only the non-diffusible hydrogen released from the steel at a predetermined temperature or higher is measured. Diffusible hydrogen in a sample of small size is released from the sample to be scattered even at room temperature, and therefore the diffusible hydrogen is not measured. Non-diffusible hydrogen is trapped in any defect in the steel and only released from the sample at a predetermined heating temperature or higher. Even if only the non-diffusible hydrogen is measured, the hydrogen content considerably varies depending on the method of measurement. The above mentioned range of hydrogen content is determined by thermal conductimetry. In addition, as detailed later, the measurement may be taken by means of a LECO DH-103 hydrogen determinator or like measuring device.

The above-described transmission component is preferably a rolling bearing rotatably supporting the input shaft, the output shaft, or each of the toothed wheels, and the rolling bearing is a tapered roller bearing.

The above-described transmission component is preferably a rolling bearing rotatably supporting the input shaft, the output shaft, or each of the toothed wheels, and the rolling bearing is a needle roller bearing.

The above-described transmission component is preferably a rolling bearing rotatably supporting the input shaft, the output shaft, or each of the toothed wheels, and the rolling bearing is a ball bearing.

The present invention provides a method of manufacturing a transmission component incorporated into a transmission capable of changing a rotational speed of an output shaft relative to a rotational speed of an input shaft by means of mesh of toothed wheels. The component is formed at least by carbonitriding steel for a bearing's component at a temperature higher than an $A_1$ transformation point and then cooling the steel to a temperature lower than the $A_1$ transformation point and subsequently reheating the steel to a range of temperature of no less than the $A_1$ transformation point and less than the temperature applied to carbo-nitride the steel, and quenching the steel.

In the present method of manufacturing the transmission component, after steel is carbonitrided the steel is cooled to a temperature of less than the $A_1$ transformation point before it is finally quenched. A fine austenite grain size can be obtained and as a result, Charpy impact, fracture toughness, anti-crack strength, fatigue life (or rolling contact fatigue life when the component is a rolling bearing or a rolling bearing's component) and the like can be improved.

Furthermore for example by cooling to a temperature at which austenite transforms, austenite grain boundary in carbonitriding can be irrelevant to that in final quenching. Furthermore, the final quenching temperature is lower than the carbonitriding temperature, and thus the amount of un-dissolved cementite in the surface layer, which is influenced by the carbonitriding process, increases as compared with that in the carbonitriding process. As such the ratio of un-dissolved cementite increases while the ratio of austenite decreases at the heating temperature in the final quenching as compared with those ratios in the carbonitriding process. In addition, it is seen from the Fe—C binary phase diagram that, in the range where cementite and austenite coexist, the concentration of carbon in solid solution of the carbon and austenite decreases as the quenching temperature decreases.

When the temperature is increased to the final quenching temperature, austenite grains are made fine since there remain a large amount of un-dissolved cementite that prevent growth of austenite grains. Moreover, the structure transformed from austenite to martensite through quenching has a low carbon concentration, so that the structure has high toughness as compared with the structure quenched from the carbonitriding temperature.

In the present method of manufacturing the transmission component, preferably the steel is heated to a range of temperature of 790° C. to 830° C. before it is quenched.

The steel is again heated to a temperature hardly allowing an austenite grain to be grown before the steel is quenched. Fine austenite grain size can thus be achieved.

The present invention provides a tapered roller bearing having an inner ring, an outer ring, and a tapered roller. At least any one of the inner ring, the outer ring, and the tapered roller has a nitriding layer and an austenite grain with a grain size number falling within a range exceeding 10.

In the tapered roller bearing according to the present invention, at least any one of the inner ring, the outer ring and the rolling element that provides a small austenite grain size allows significantly increased anti-crack strength, dimensional stability and rolling contact fatigue life. With the austenite grain size number of 10 or less, any remarkable improvement of the rolling fatigue life is impossible and thus the grain size number is greater than 10, and preferably 11 or greater. Although further finer austenite grains are desirable, the grain size number exceeding 13 is usually difficult to achieve. Note that an austenite grain of the inner ring, the outer ring, and the rolling element of the support structure of the shaft in the transmission does not vary whether it may be in a surface layer portion significantly affected as it is carbonitrided or a portion inner than the surface layer portion. As such, the surface layer portion and the inner portion will be set as positions serving as subjects of the aforementioned grain number range.

The inner and outer rings in this specification may be integrated with a member such as a shaft or a housing, or may be provided separately from such a member.

The austenite grain also refers to a trace thereof remaining after the austenite is transformed into ferrite phase such as martensite or bainite through quenching. An austenite grain boundary before quenching is sometimes referred to as a "prior austenite grain boundary" to be distinguished from the remaining austenite grain after quenching. That is, the "austenite grain" and the "prior austenite grain boundary" are used to mean the same.

The prior austenite grain boundaries can be observed after being subjected to a process developing a grain boundary such as an etching process for a metal phase sample of the member of interest. For measurement of the grain size, the average of ASTM (American Society for Testing and Materials)-defined grain size numbers (=average grain size of at most 8 μm) may be converted to obtain an average grain diameter, or the intercept method or the like may be used in which a straight line is placed on a metal phase structure in an arbitrary direction to obtain an average length between points at which the straight line meets grain boundaries.

The above-described nitriding layer is formed by a carbonitriding process as will be described below. The nitriding layer may or may not be enriched with carbon.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, embodiments of the present invention will be described with reference to the drawings.

Figure 1:
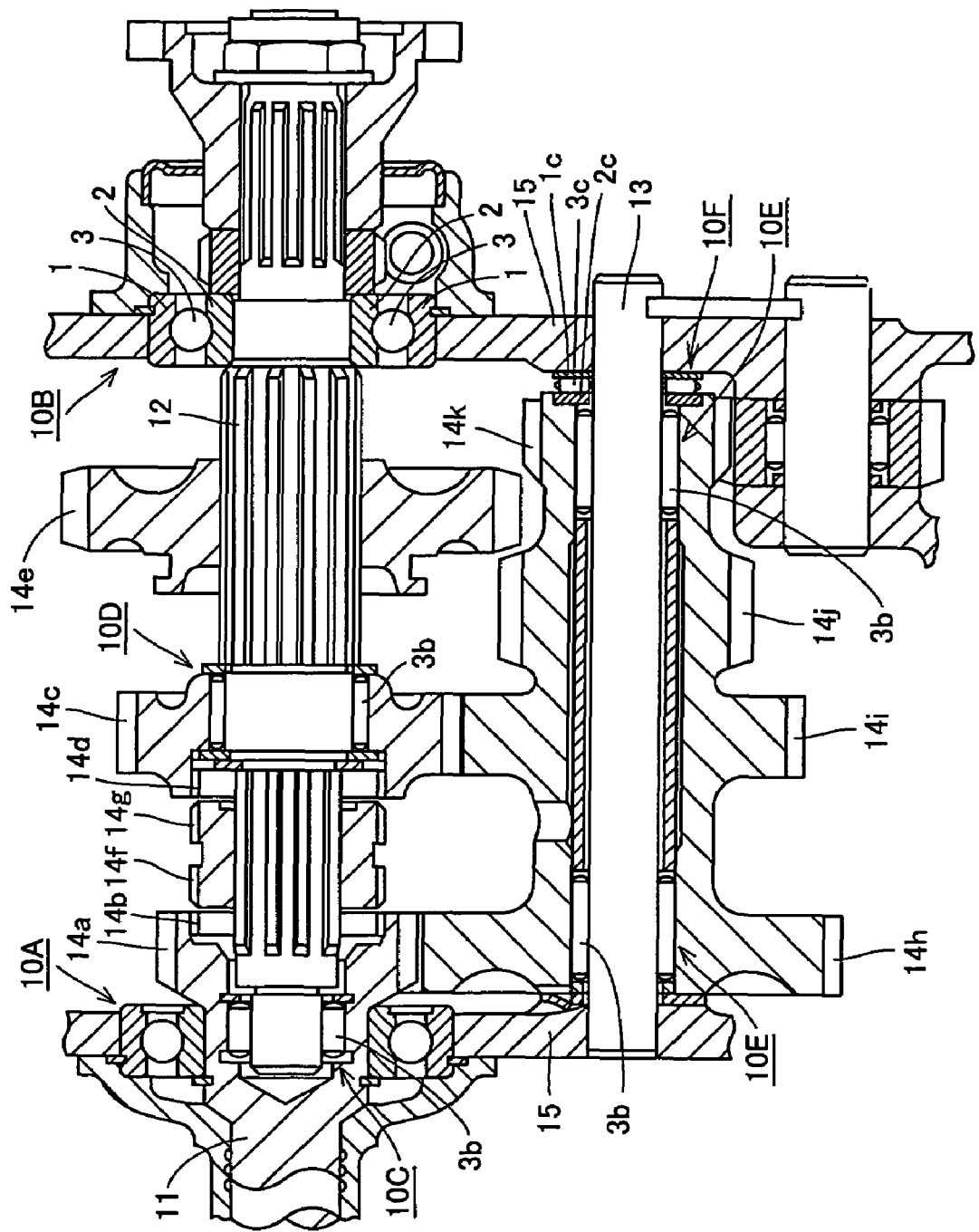
FIG. 1 is a schematic cross-sectional view of the configuration of a transmission into which a transmission component is incorporated in accordance with one embodiment of the present invention.

Referring to FIG. 1, this transmission is a constant mesh transmission mainly including rolling bearings 10A to 10F, an input shaft 11, an output shaft 12, a counter shaft 13, gears (toothed wheels) 14a to 14k, and a housing 15.

Input shaft 11 is rotatably supported by housing 15 via rolling bearing 10A. Gear 14a is provided at the outer peripheral portion of this input shaft 11, and gear 14b is provided at the inner peripheral portion thereof.

One side of output shaft 12 is rotatably supported by housing 15 via rolling bearing 10B, while the other side of output shaft 12 is rotatably supported by input shaft 11 via rolling bearing 10C. This output shaft 12 is provided with gears 14c to 14g. The axial load of these gears 14c to 14g is supported by rolling bearing 10F that is a thrust needle roller bearing.

Gears 14c and 14d are provided at the outer and inner peripheral portions of a single member, respectively. The member with gears 14c and 14d is rotatably supported by output shaft 12 via rolling bearing 10D. Gear 14e is mounted on output shaft 12 such that it rotates with output shaft 12 and is slidable in the axial direction of output shaft 12.

Gears 14f and 14g are each provided at the outer peripheral portion of a single member. The member with gears 14f and 14g is mounted on output shaft 12 such that it rotates with output shaft 12 and is slidable in the axial direction of output shaft 12. When the member with gears 14f and 14g slides to the left in the figure, gear 14f can mesh with gear 14b. When the member with gears 14f and 14g slides to the right in the figure, gear 14g can mesh with gear 14d.

Counter shaft 13 is secured to housing 15. Counter shaft 13 rotatably supports a gear member having gears 14h to 14k or the like via rolling bearing 10E. Gear 14h is in constant mesh with gear 14a, and gear 14i is in constant mesh with gear 14c. When gear 14e slides to the left in the figure, gear 14j can mesh with gear 14e. When gear 14e slides to the right in the figure, gear 14k can mesh with gear 14e.

In the present embodiment, the support structure for input shaft 11 has rolling bearings 10A and 10C, while the support structure for output shaft 12 has rolling bearings 10B and 10C. Rolling bearings 10A and 10B are deep groove ball bearings, for example. Rolling bearing 10C is a needle roller bearing, for example. The support structure for gears 14c and 14h to 14k has rolling bearings 10D to 10F. Rolling bearings 10D and 10E are needle roller bearings, for example. Rolling bearing 10F is a thrust needle roller bearing.

Figure 2:
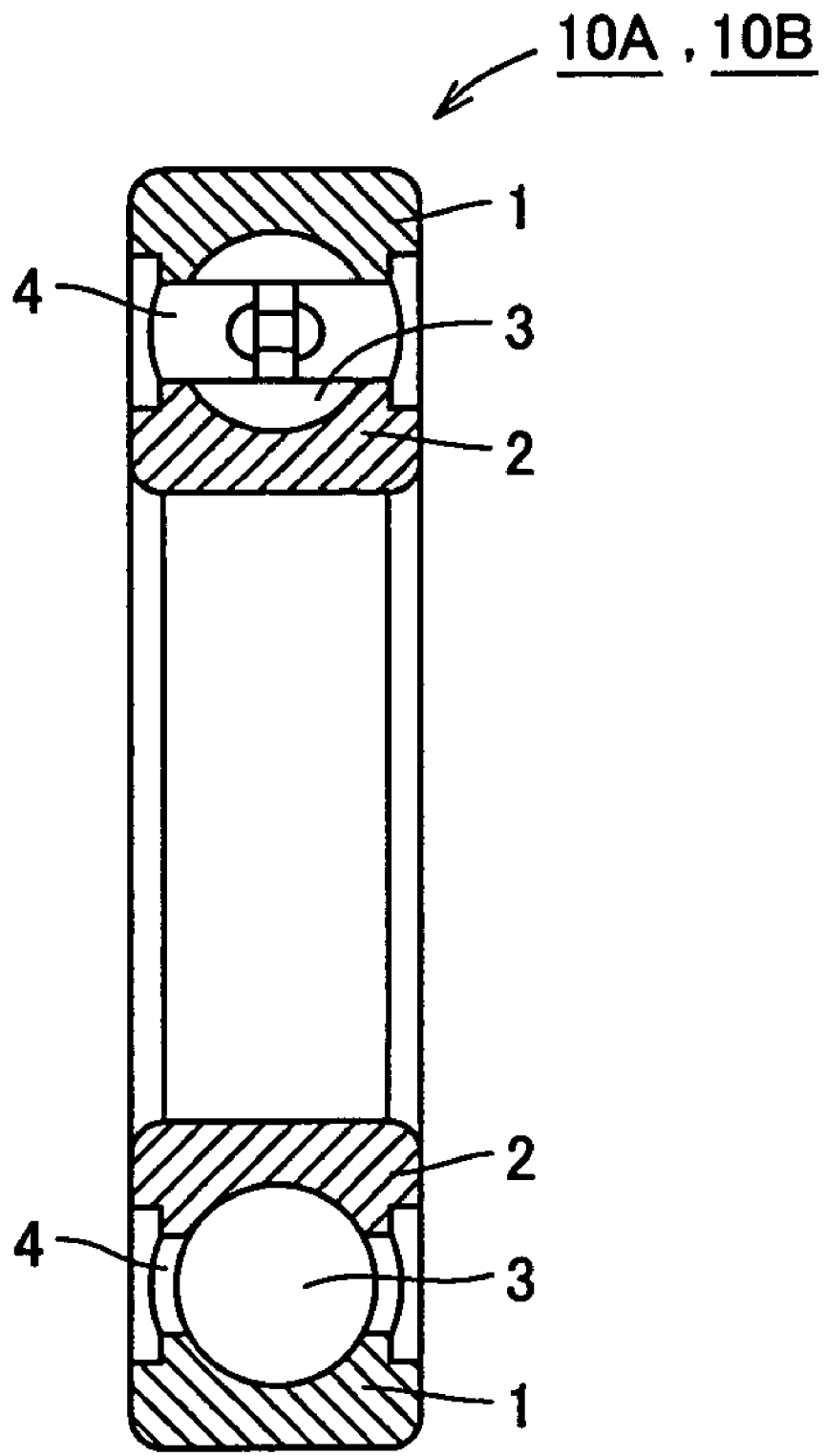
FIG. 2 is a schematic cross-sectional view of the configuration of a deep groove ball bearing serving as rolling bearings 10A and 10B shown in FIG. 1.

Referring to FIG. 2, deep groove ball bearings 10A and 10B each have an outer ring 1 (an outer member) secured to housing 15, an inner ring 2 (an inner member) secured to input shaft 11 or output shaft 12, a plurality of balls 3 rolling between outer ring 1 and inner ring 2, and a cage 4 holding the plurality of balls 3 in place with a constant space therebetween.

Referring back to FIG. 1, the needle roller bearing serving as rolling bearing 10C has a cage and roller configuration in which a plurality of needle rollers 3b are held by a cage. In this configuration, an outer member of rolling bearing 10C is integrated with input shaft 11, while an inner member thereof is integrated with output shaft 12.

The needle roller bearings serving as rolling bearings 10D and 10E each have a cage and roller configuration in which a plurality of needle rollers 3b are held by a cage. In this configuration, outer members of the rolling bearings are integrated with gears 14c to 14k, while inner members thereof are integrated with output shaft 12 or counter shaft 13. The thrust needle roller bearing serving as rolling bearing 10F has an outer ring 1c (an outer member) secured to counter shaft 13, an inner ring 2c (an inner member) secured to the gear member having gears 14h to 14k, a plurality of needle rollers 3c rolling between outer ring 1c and inner ring 2c, and a cage holding the plurality of needle rollers 3c in place with a constant space therebetween.

The transmission component incorporated into the above-described transmission (for example, at least one of the outer member, the inner member, and the rolling element of rolling bearings 10A to 10F, input shaft 11, output shaft 12, counter shaft 13, gears (toothed wheels) 14a to 14k, housing 15, and the like) has a nitriding layer at a surface layer and an austenite grain with a grain size number falling within a range exceeding 10.

Particularly when at least any one of the outer member, the inner member, and the rolling element of each of rolling bearings 10A to 10F is the transmission component in accordance with the present embodiment, at least any one of the outer member (outer ring 1, an outer ring portion of output shaft 12, or gears 14c, 14h to 14k), the inner member (inner ring 2, an inner ring portion of input shaft 11, an inner ring portion of output shaft 12, or an inner ring portion of counter shaft 13), and the rolling element (ball 3 or needle rollers 3b, 3c) includes steel having a nitriding layer and has an austenite grain with a grain size number falling within a range exceeding 10.

Furthermore, the transmission component incorporated into the above-described transmission (for example, at least one of the outer member, the inner member, and the rolling element of rolling bearings 10A to 10F, input shaft 11, output shaft 12, counter shaft 13, gears (toothed wheels) 14a to 14k, housing 15, and the like) has a nitriding layer at a surface layer and a fracture stress value of at least 2650 MPa.

Particularly when at least any one of the outer member, the inner member, and the rolling element of each of rolling bearings 10A to 10F is the transmission component in accordance with the present embodiment, at least any one of the outer member (outer ring 1, the outer ring portion of output shaft 12, or gears 14c, 14h to 14k), the inner member (inner ring 2, the inner ring portion of input shaft 11, the inner ring portion of output shaft 12, or the inner ring portion of counter shaft 13), and the rolling element (ball 3 or needle rollers 3b, 3c) includes steel having a nitriding layer and has a fracture stress value of at least 2650 MPa.

Furthermore, the transmission component incorporated into the above-described transmission (for example, at least one of the outer member, the inner member, and the rolling element of rolling bearings 10A to 10F, input shaft 11, output shaft 12, counter shaft 13, gears (toothed wheels) 14a to 14k, housing 15, and the like) has a nitriding layer at a surface layer and a hydrogen content in steel that is at most 0.5 ppm.

Particularly when at least any one of the outer member, the inner member, and the rolling element of each of rolling bearings 10A to 10F is the transmission component in accordance with the present embodiment, at least any one of the outer member (outer ring 1, the outer ring portion of output shaft 12, or gears 14c, 14h to 14k), the inner member (inner ring 2, the inner ring portion of input shaft 11, the inner ring portion of output shaft 12, or the inner ring portion of counter shaft 13), and the rolling element (ball 3 or needle rollers 3b, 3c) includes steel having a nitriding layer and has a hydrogen content in steel that is at most 0.5 ppm.

In the following, a description will be given about a speed-change operation of this transmission.

When gear 14f does not mesh with gear 14b, gear 14g does not mesh with gear 14d, and gear 14e meshes with gear 14j, the driving force of input shaft 11 is transmitted to output shaft 12 via gears 14a, 14h, 14j, and 14e. The transmission in this state is in the first gear, for example.

When gear 14g meshes with gear 14d and gear 14e does not mesh with gear 14j, the driving force of input shaft 11 is transmitted to output shaft 12 via gears 14a, 14h, 14i, 14c, 14d, and 14g. The transmission in this state is in the second gear, for example.

When gear 14f meshes with gear 14b and gear 14e does not mesh with gear 14j, the mesh of gears 14b and 14f couples input shaft 11 directly to output shaft 12 so that the driving force of input shaft 11 is transmitted directly to output shaft 12. The transmission in this state is in the third gear (high gear), for example.

In the following, a description will be given about a heat treatment including a carbonitriding process performed on the transmission component according to the present embodiment.

Figure 3:
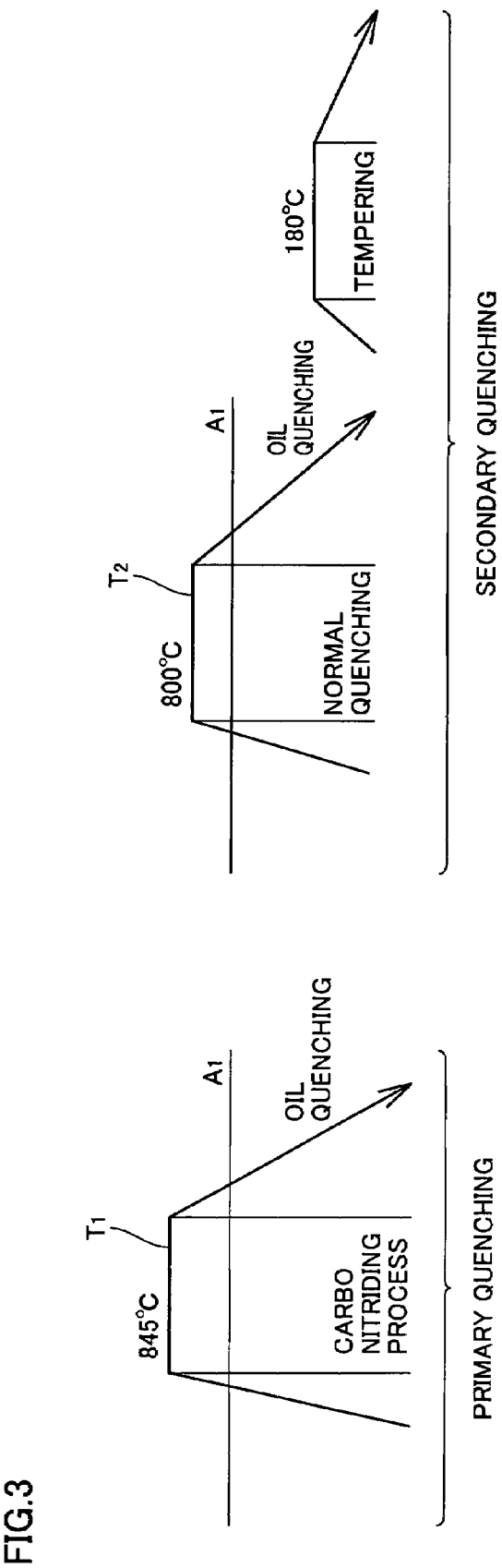
FIG. 3 is a diagram for illustrating a method of a thermal treatment applied to the transmission component in an embodiment of the present invention.
Figure 4:
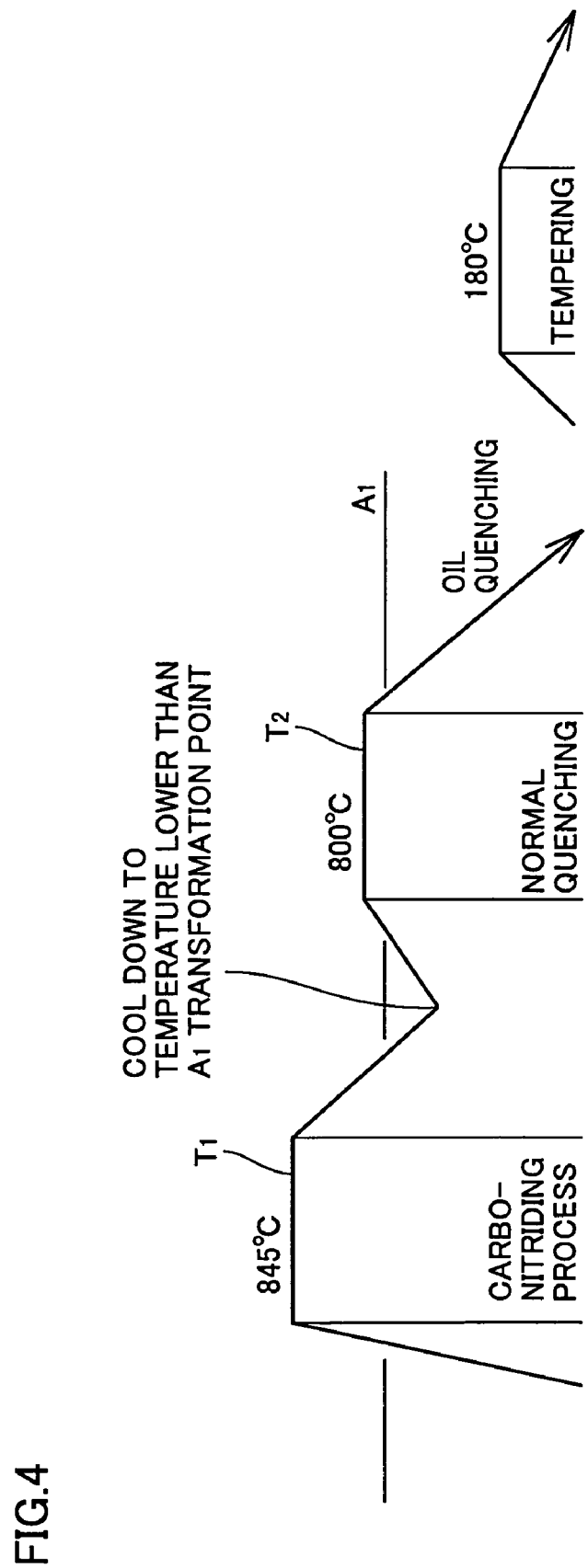
FIG. 4 is a diagram for illustrating an exemplary variation of the method of the thermal treatment applied to the transmission component in the embodiment of the present invention.

FIG. 3 shows a heat treatment pattern according to which primary quenching and secondary quenching are carried out, and FIG. 4 shows a heat treatment pattern according to which a material is cooled to a temperature lower than the $A_1$ transformation point in a quenching process and thereafter heated again to be finally quenched. Both are exemplary embodiments of the present invention.

Referring to FIG. 3, steel for a bearing's component is first heated to a temperature for carbonitriding (e.g. 845° C.) higher than the $A_1$ transformation point. At this temperature, the steel is subjected to carbonitriding process. At the temperature of a treatment $T_1$, carbon and nitrogen are diffused in a steel matrix such that the carbon can sufficiently be included in the steel. Thereafter, at the temperature of treatment $T_1$ the steel for the bearing's component is subjected to oil quenching to be cooled down to a temperature lower than the $A_1$ transformation point. Then, the steel may be subjected to tempering at 180° C. This tempering, however, may be omitted.

Thereafter, the steel is again heated to a temperature (e.g. 800° C.) of no less than the $A_1$ transformation point and less than the temperature applied to carbo-nitride the steel. At this temperature, the steel is maintained to be subjected to a treatment $T_2$. Then, at the temperature of treatment $T_2$, the steel is subjected to oil quenching to be cooled down to a temperature lower than the $A_1$ transformation point. Thereafter, the steel is subjected to tempering at 180° C.

Referring to FIG. 4, steel for a bearing's component is first heated to a temperature for carbonitriding (e.g. 845° C.) higher than the $A_1$ transformation point. At this temperature, the steel is subjected to carbonitriding process. At the temperature of treatment $T_1$, carbon and nitrogen are diffused in a steel matrix such that the carbon can sufficiently be included in the steel. Thereafter, the steel for the bearing's component is not quenched, but is cooled down to a temperature of no more than the $A_1$ transformation point. Thereafter, the steel is again heated to a temperature (e.g. 800° C.) of no less than the $A_1$ transformation point and less than the temperature applied to carbonitride the steel. At this temperature, the steel is maintained to be subjected to treatment $T_2$. Then, at the temperature of treatment $T_2$, the steel is subjected to oil quenching to be cooled down to a temperature lower than the $A_1$ transformation point. Thereafter, the steel is subjected to tempering at 180° C.

Compared with ordinary or normal quenching (by which carbonitriding is done and immediately thereafter quenching is done once), the above-discussed heat treatment can provide enhanced the crack strength and reduced secular dimensional variation rate while carbonitriding the surface layer. This heat treatment can also produce a microstructure having austenite crystal grains of a grain size which is smaller than the conventional one by one half or more. The transmission component subjected to the above-described heat treatment can have a long fatigue life (or a long rolling contact fatigue life when the component is a rolling bearing or a rolling bearing's component), an increased anti-crack strength, and a reduced secular dimensional variation rate.

The above-described thermal treatments both allow their carbonitriding processes to produce a nitriding layer that is a "carbonitriding layer." Since the material for the carbonitriding process, the steel, has a high concentration of carbon, carbon in the atmosphere of the normal carbonitriding process might not enter the surface of the steel easily. For example, with steel having a high concentration of carbon (approximately 1% by weight), a carburized layer may have a higher concentration of carbon than this value, or a carburized layer may be formed without having a higher concentration of carbon than this value. A concentration of nitrogen in normal steel, however, is typically as low as approximately no more than 0.025 wt % at the maximum although it depends on a concentration of Cr or the like. Therefore, a nitriding layer can apparently be formed regardless of the concentration of carbon in source steel. It will be appreciated that the above-described nitriding layer may also be enriched with carbon.

Figure 5A:
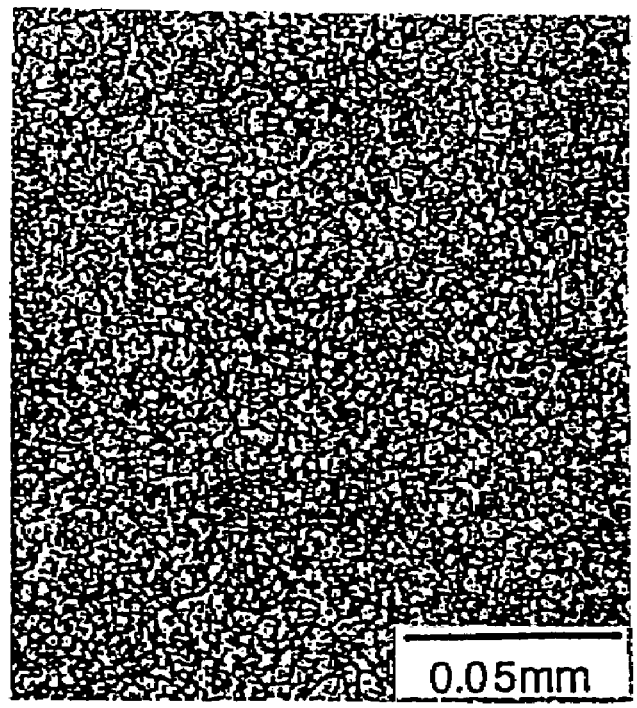
FIG. 5A shows a microstructure, more specifically, austenite grain of a bearing according to the present invention.
Figure 5B:
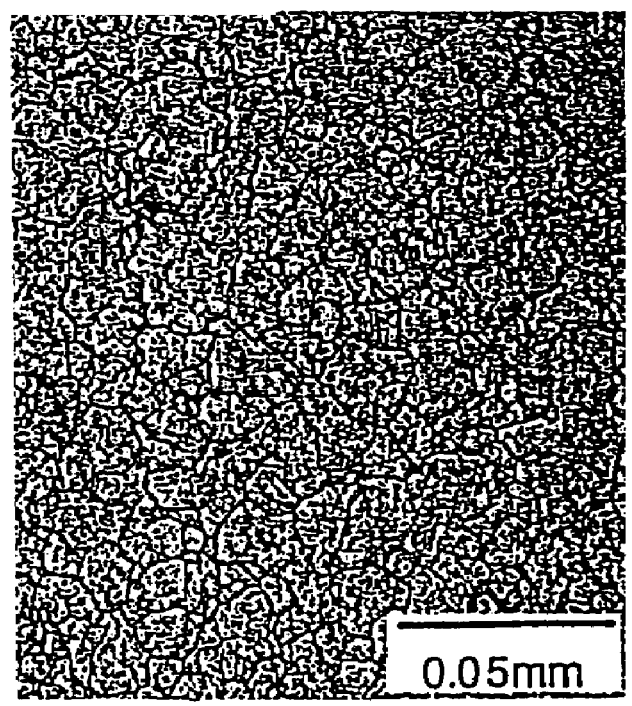
FIG. 5B shows a microstructure, more specifically, austenite grain of a bearing in the background art.
Figure 6A:
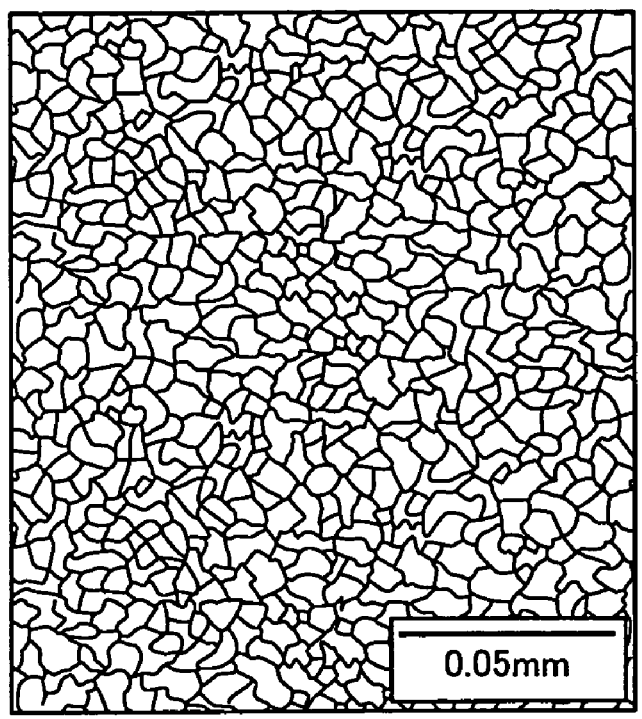
FIG. 6A is a drawing of the austenite grain boundary shown in FIG. 5A.
Figure 6B:
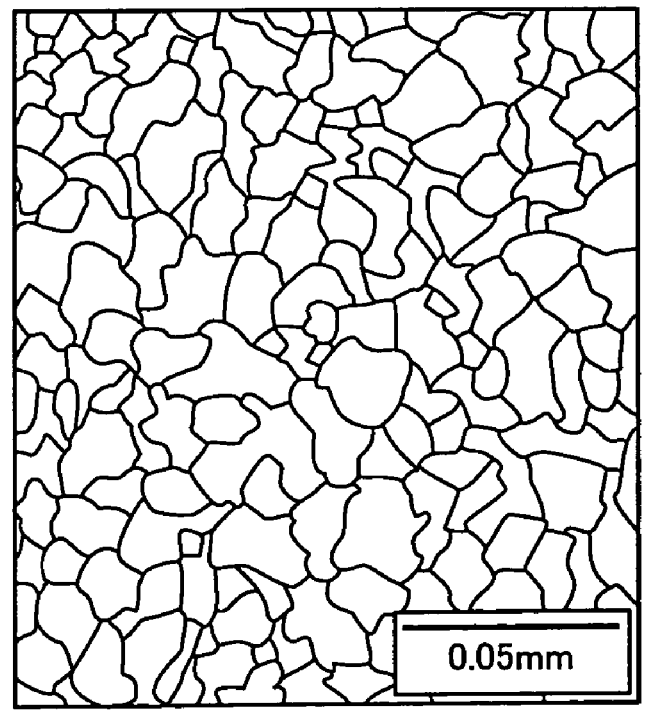
FIG. 6B is a drawing of the austenite grain boundary shown in FIG. 5B.

FIG. 5A shows a grain size of austenite of a bearing steel having been heat-treated as shown in FIG. 3. For comparison, FIG. 5B shows a grain size of austenite of a bearing steel which has undergone the conventional heat treatment. FIGS. 6A and 6B diagrammatically show the grain sizes of austenite that are shown in FIGS. 5A and 5B. In the structures with the crystal grain sizes of austenite, the grain diameter of the conventional austenite is 10 which is a grain size number defined by JIS (Japanese Industrial Standard) while that of the present invention through the heat treatment thereof is 12 and thus fine grains are seen. Further, the average grain diameter in FIG. 5A is 5.6 μm measured by the intercept method.

In the following, a description will be given about a modification of the support structure for the shaft in the transmission.

In the configuration shown in FIG. 1, rolling bearings 10A and 10B as the support structure for the shaft were deep groove ball bearings. Rolling bearings 10A and 10B, however, may be tapered roller bearings as shown in FIG. 7 or cylindrical roller bearings as shown FIG. 8.

Figure 7:
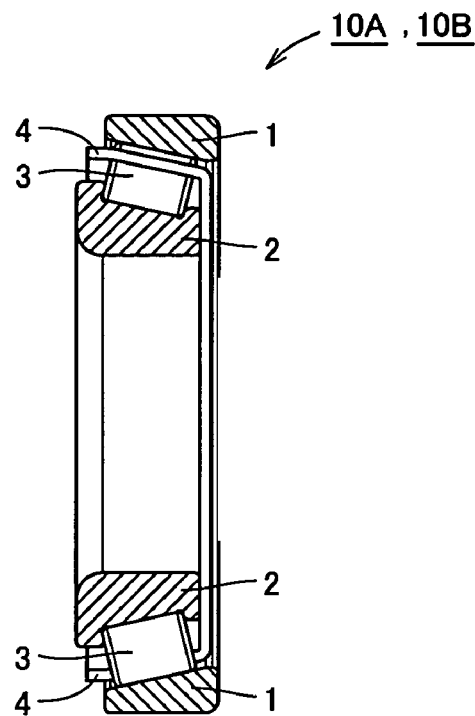
FIG. 7 is a schematic cross-sectional view of the configuration of a tapered roller bearing.
Figure 8:
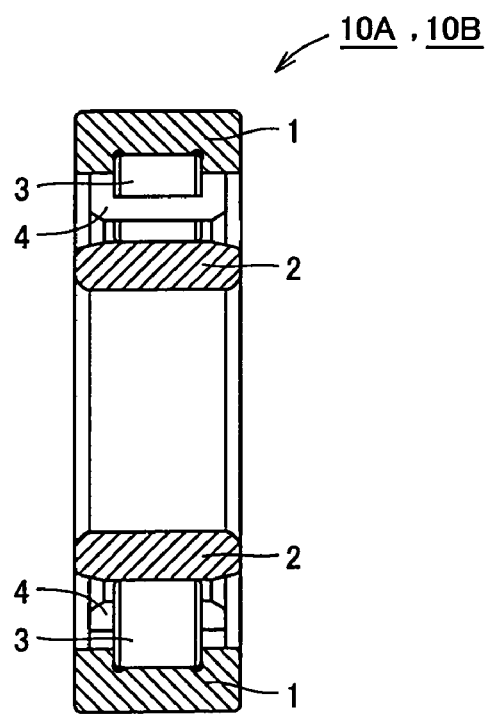
FIG. 8 is a schematic cross-sectional view of the configuration of a cylindrical roller bearing.

When at least any one of an outer member (outer ring 1), an inner member (inner ring 2), and a rolling element (roller 3) of each of the tapered roller bearing in FIG. 7 and the cylindrical roller bearing in FIG. 8 is the transmission component in accordance with the present embodiment, the any one of the members includes steel having a nitriding layer and has an austenite grain with a grain size number falling within a range exceeding 10.

Furthermore, when at least any one of the outer member (outer ring 1), the inner member (inner ring 2), and the rolling element (roller 3) of each of the tapered roller bearing in FIG. 7 and the cylindrical roller bearing in FIG. 8 is the transmission component in accordance with the present embodiment, the any one of the members includes steel having a nitriding layer and has a fracture stress value of at least 2650 MPa.

Moreover, when at least any one of the outer member (outer ring 1), the inner member (inner ring 2), and the rolling element (roller 3) of each of the tapered roller bearing in FIG. 7 and the cylindrical roller bearing in FIG. 8 is the transmission component in accordance with the present embodiment, the any one of the members includes steel having a nitriding layer and has a hydrogen content in the steel that is at most 0.5 ppm.

When at least any one of the outer member (outer ring 1), the inner member (inner ring 2), and the rolling element (roller 3) of each of the tapered roller bearing in FIG. 7 and the cylindrical roller bearing in FIG. 8 is the transmission component in accordance with the present embodiment, the any one of the members is formed by the method as described in FIGS. 3 and 4.

The tapered roller bearing shown in FIG. 7 has, between outer ring 1 and inner ring 2, a plurality of tapered rollers (conical rollers) 3 held by cage 4. This tapered roller bearing is designed such that the raceway surfaces of outer ring 1 and inner ring 2 and the vertex of a cone of roller 3 meet at a point on the center line of the bearing. Therefore, the resultant of forces from the raceway surfaces of outer ring 1 and inner ring 2 presses roller 3 against a large collar of inner ring 2 while guiding and rolling roller 3 along the raceway.

The cylindrical roller bearing shown in FIG. 8 has, between outer ring 1 and inner ring 2, a plurality of cylindrical rollers 3 held by cage 4.

Figure 9:
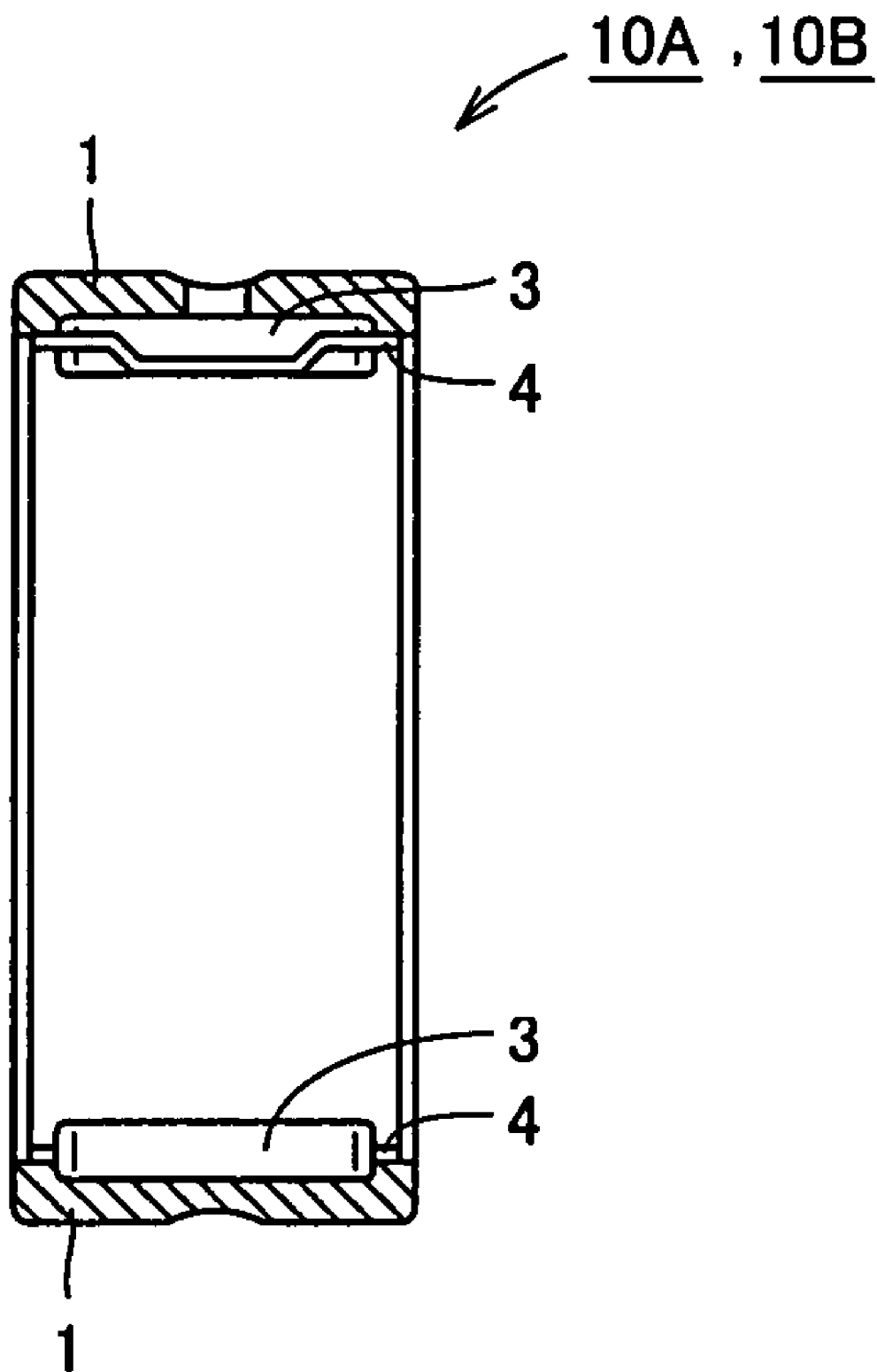
FIG. 9 is a schematic cross-sectional view of the configuration of a needle roller bearing.

The needle roller bearing shown in FIG. 9 has, between outer ring 1 and an inner ring portion (not shown), a plurality of needle rollers 3 held by cage 4. Roller 3 generally has a diameter of at most 5 mm and a length 3 to 10 times as long as the diameter.

Figure 10:
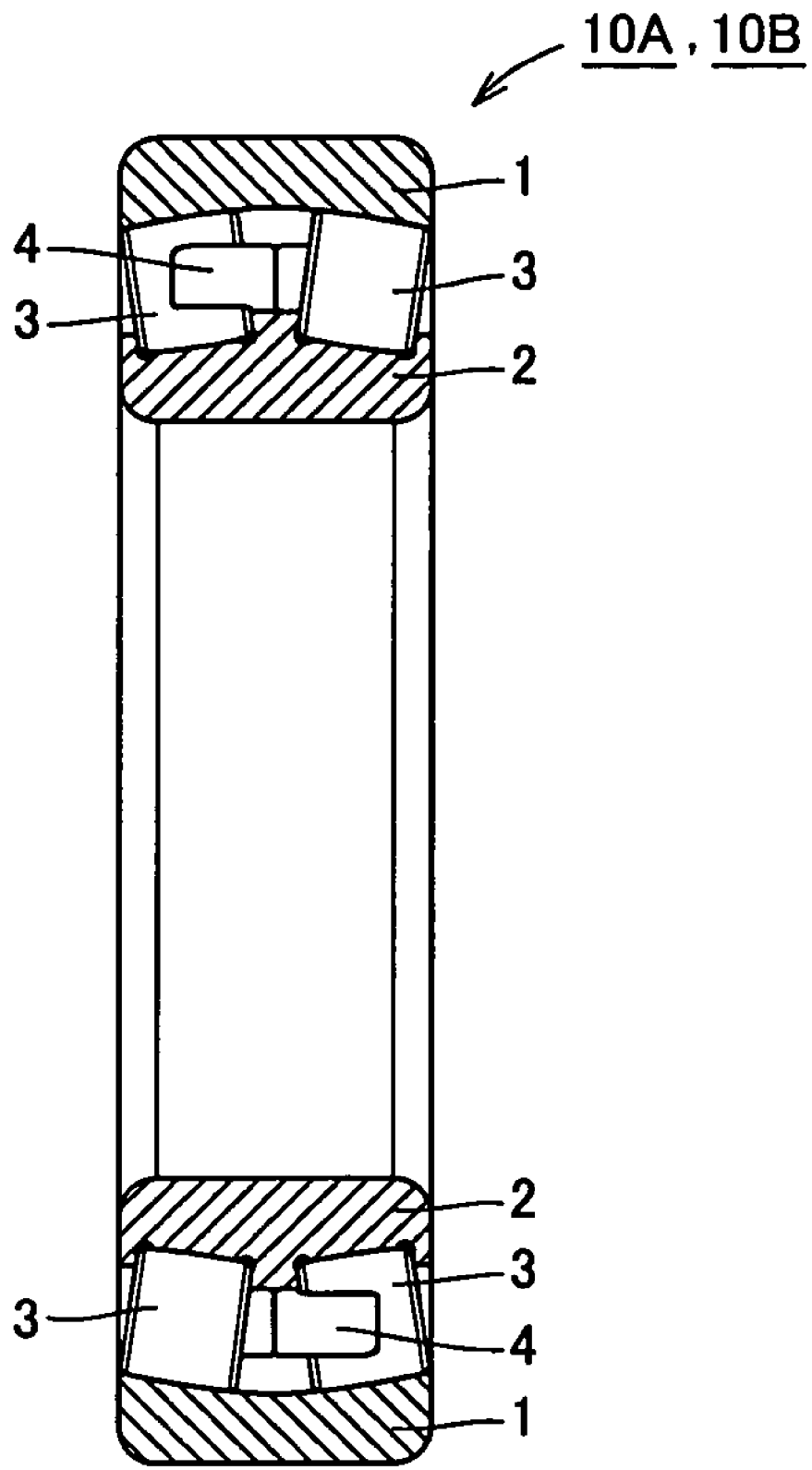
FIG. 10 is a schematic cross-sectional view of the configuration of a self-aligning roller bearing.

The self-aligning roller bearing shown in FIG. 10 has, between outer ring 1 and inner ring 2, barrel-shaped rollers 3 arranged in two lines and held by cage 4. Such barrel-shaped rollers 3 arranged in two lines give a self-aligning ability capable of handling the inclination of the shaft or the like.

Figure 11:
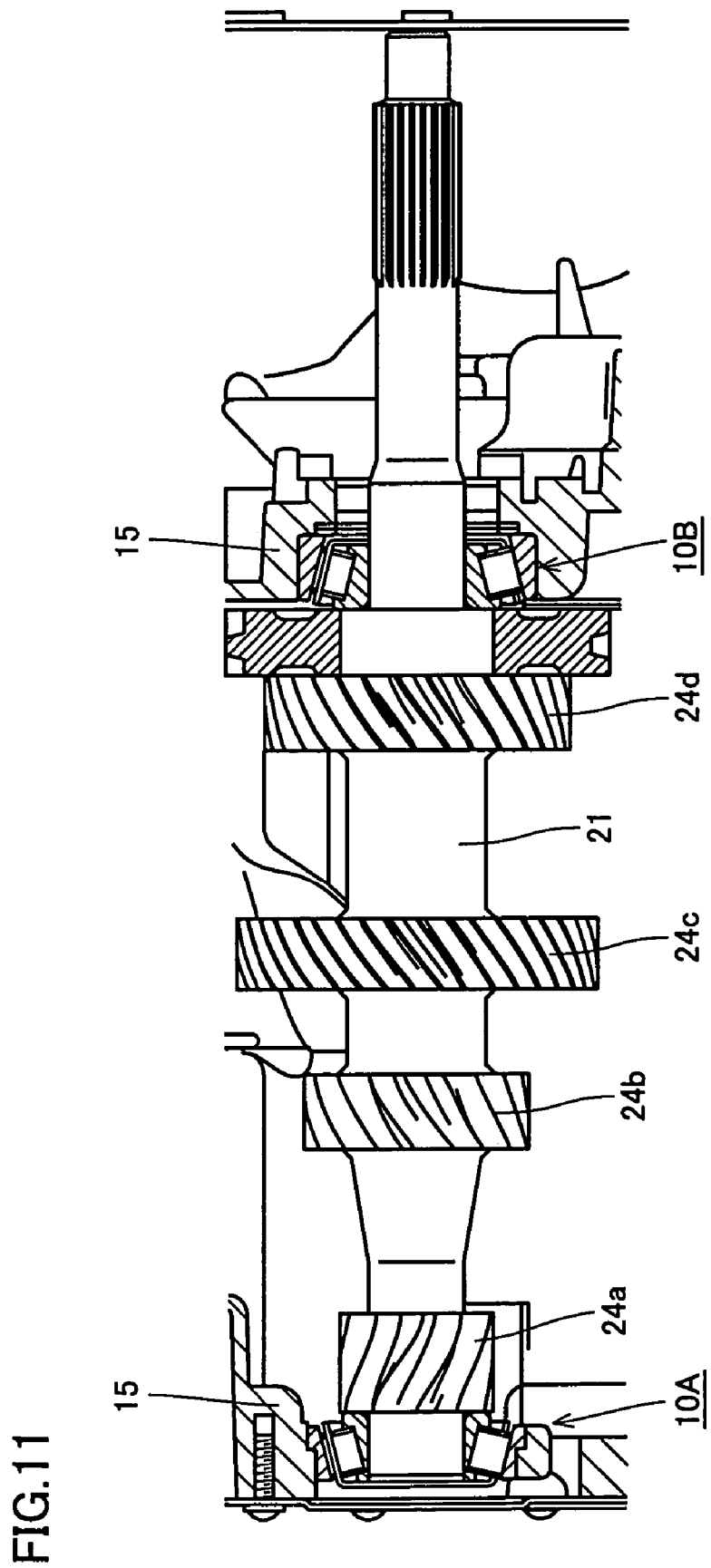
FIG. 11 is a schematic diagram showing the configuration in which the tapered roller bearing shown in FIG. 7 is utilized as a support structure of a shaft in a transmission.

Referring to FIG. 11, a shaft 21 on which a plurality of gears 24a to 24d are provided is rotatably supported by housing 15 via tapered roller bearing 10A (or 10B).

Figure 12:
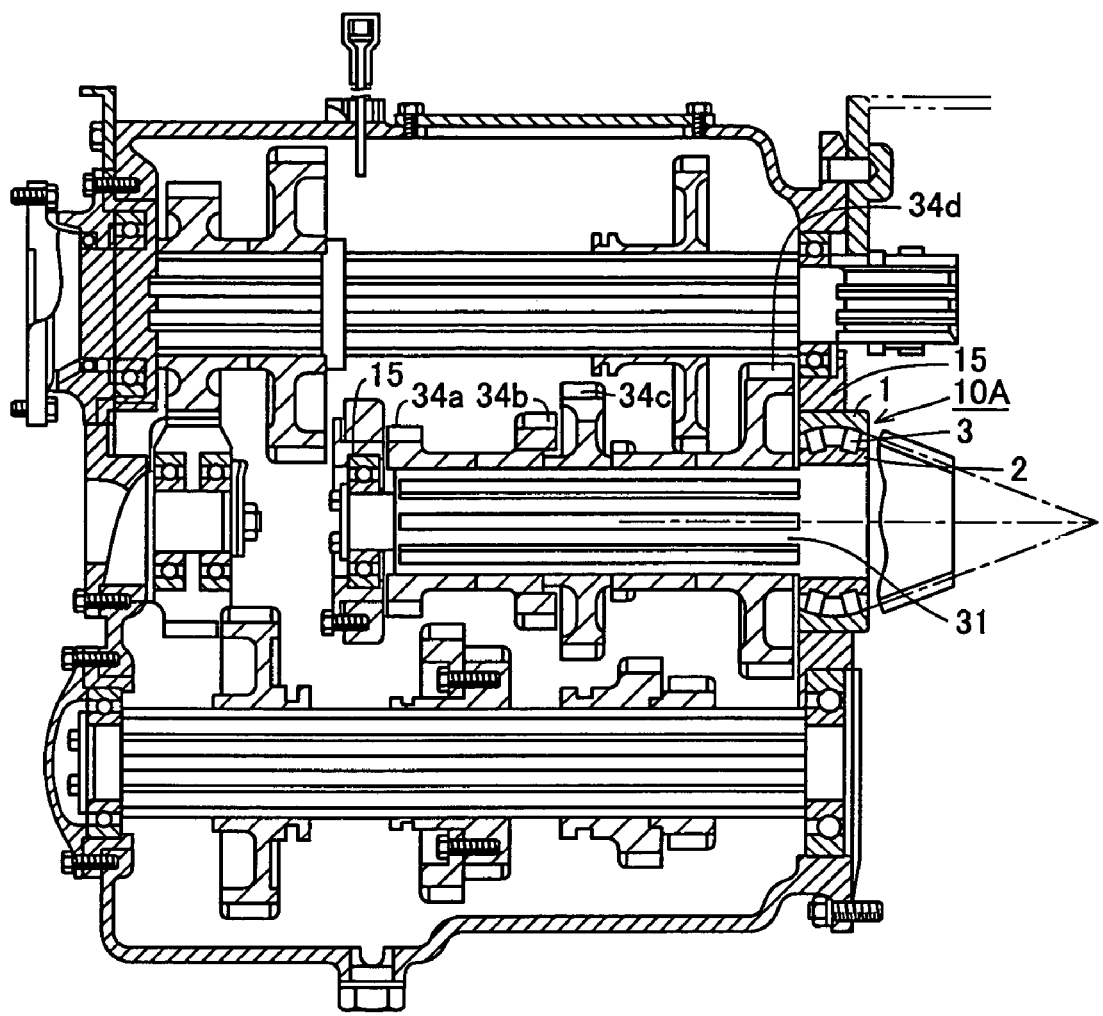
FIG. 12 is a schematic diagram showing the configuration in which the self-aligning roller bearing shown in FIG. 10 is utilized as a support structure of a shaft in a transmission.

Referring to FIG. 12, a shaft 31 on which a plurality of gears 34a to 34d are provided is rotatably supported by housing 15 via self-aligning roller bearing 10A.

The transmission component incorporated into the transmission shown in FIG. 11 or 12 (for example, at least one of the plurality of gears 24a to 24d, shaft 21, the outer member, the inner member, and the rolling element of tapered roller bearings 10A and 10B, housing 15, and the like shown in FIG. 11, or at least one of the plurality of gears 34a to 34d, shaft 31, the outer member, the inner member, and the rolling element of self-aligning roller bearing 10A, housing 15, and the like shown in FIG. 12) has a nitriding layer at a surface layer and an austenite grain with a grain size number falling within a range exceeding 10.

The transmission component incorporated into the transmission shown in FIG. 11 or 12 (for example, at least one of the plurality of gears 24a to 24d, shaft 21, the outer member, the inner member, and the rolling element of tapered roller bearings 10A and 10B, housing 15, and the like shown in FIG. 11, or at least one of the plurality of gears 34a to 34d, shaft 31, the outer member, the inner member, and the rolling element of self-aligning roller bearing 10A, housing 15, and the like shown in FIG. 12) has a nitriding layer at a surface layer and a fracture stress value of at least 2650 MPa.

The transmission component incorporated into the transmission shown in FIG. 11 or 12 (for example, at least one of the plurality of gears 24a to 24d, shaft 21, the outer member, the inner member, and the rolling element of tapered roller bearings 10A and 10B, housing 15, and the like shown in FIG. 11, or at least one of the plurality of gears 34a to 34d, shaft 31, the outer member, the inner member, and the rolling element of self-aligning roller bearing 10A, housing 15, and the like shown in FIG. 12) has a nitriding layer at a surface layer and a hydrogen content in the steel that is at most 0.5 ppm.

In the configuration shown in FIG. 1, rolling bearing 10C as the support structure for the shaft was a needle roller bearing. Rolling bearing 10C, however, may be the deep groove ball bearing as shown in FIG. 2, the tapered roller bearing as shown in FIG. 7, the cylindrical roller bearing as shown in FIG. 8, the needle roller bearing (the configuration having an outer ring or an inner ring) as shown in FIG. 9, or the self-aligning roller bearing as shown in FIG. 10.

The constant-mesh transmission has mainly been described in the above embodiment. The present invention, however, is not limited to this type of transmission. The present invention is also applicable to other types of transmissions such as a sliding-mesh transmission or a synchromesh transmission.

The present invention in examples will now be described.

EXAMPLE 1

JIS-SUJ2 (1.0 wt % of C-0.25 wt % of Si-0.4 wt % of Mn-1.5 wt % of Cr) was used for Example 1 of the present invention. Samples shown in Table 1 were each produced through the procedure described below.

TABLE 1

| Samples | A | B | C | D | E | F | Conventionally carbonitrided product | Normally quenched product |
|---|---|---|---|---|---|---|---|---|
| Secondary quenching temp.(° C.) | 780[1] | 800 | 815 | 830 | 850 | 870 | — | — |

TABLE 1-continued

| Samples | A | B | C | D | E | F | Conventionally carbonitrided product | Normally quenched product |
|---|---|---|---|---|---|---|---|---|
| Hydrogen content (ppm) | — | 0.37 | 0.40 | 0.38 | 0.42 | 0.40 | 0.72 | 0.38 |
| Grain size No. (JIS) | — | 12 | 11.5 | 11 | 10 | 10 | 10 | 10 |
| Charpy impact value (J/cm$^2$) | — | 6.65 | 6.40 | 6.30 | 6.20 | 6.30 | 5.33 | 6.70 |
| Fracture stress value (MPa) | — | 2840 | 2780 | 2650 | 2650 | 2700 | 2330 | 2770 |
| Rolling contact fatigue life ratio ($L_{10}$) | — | 5.4 | 4.2 | 3.5 | 2.9 | 2.8 | 3.1 | 1 |

[1])Not evaluated this time due to insufficient quenching.

Samples A-D: Examples of the Present Invention

Carbonitriding was performed at 850° C. held for 150 minutes in an atmosphere of a mixture of RX gas and ammonia gas. Following the heat treatment pattern shown in FIG. 3, primary quenching was done from a carbonitriding temperature of 850° C., and secondary quenching was subsequently done by heating to a temperature in a temperature range from 780° C. to 830° C. lower than the carbonitriding temperature. Sample A with a secondary quenching temperature of 780° C. was not tested since quenching of sample A was insufficient.

Samples E and F: Examples of the Present Invention

These samples were carbonitrided through the same procedure as that of samples A-D of the present invention, and then secondary quenched at a temperature from 850° C. to 870° C. equal to or higher than the carbonitriding temperature of 850° C.

Conventional Carbonitrided Sample: Comparative Example

Carbonitriding was performed at 850° C. held for 150 minutes in an atmosphere of a mixture of RX gas and ammonia gas. Quenching was successively done from the carbonitriding temperature and no secondary quenching was done.

Normal Quenched Sample: Comparative Example

Without carbonitriding, quenching was done by increasing the temperature to 850° C. and no secondary quenching was done.

For the samples above, tests were conducted for (1) measuring the amount of hydrogen, (2) measuring crystal grain size, (3) Charpy impact test, (4) measuring fracture stress and (5) rolling fatigue test. Their results are shown in Table 1.

Their measuring and test methods will now be described.

(1) Measurement of Hydrogen Amount

The amount of hydrogen was determined by means of a DH-103 hydrogen determinator manufactured by LECO Corporation to analyze the amount of non-diffusible hydrogen in a steel. The amount of diffusible hydrogen was not measured. Specifications of the LECO DH-103 hydrogen determinator are as follows.

Analysis range: 0.01-50.00 ppm
Analysis precision: ±0.1 ppm or ±3% H (higher one)
Analysis sensitivity: 0.01 ppm
Detection method: thermal conductimetry
Sample weight size: 10 mg-35 g (max: 12 mm (diameter)× 100 mm (length))
Furnace temperature range: 50° C.-1100° C.
Reagent: anhydron (Mg(ClO$_4$)$_2$), Ascarite (NaOH)
Carrier gas: nitrogen gas, dosing gas (hydrogen gas)

(Both gases have a purity of at least 99.99% and a pressure of 40 PSI (2.8 kgf/cm$^2$).)

The procedure of the analysis is roughly described here. A sample was taken by a dedicated sampler and the sample together with the sampler was put into the hydrogen determiner. Diffusible hydrogen therein was directed by the nitrogen carrier gas to a thermal conductimetry detector. The diffusible hydrogen was not measured in this example. Then, the sample was taken out of the sampler to be heated in a resistance heater and non-diffusible hydrogen was directed by the nitrogen carrier gas to the thermal conductimetry detector. The thermal conductivity was measured by the thermal conductimetry detector to determine the amount of non-diffusible hydrogen.

(2) Measurement of Crystal Grain Size

The crystal grain size was measured according to the method of testing the crystal grain size of austenite in a steel defined by JIS G 0551.

(3) Charpy Impact Test

A Charpy impact test was conducted according to the Charpy impact test method for a metal material defined by JIS Z 2242. A test piece used here was a U-notch test piece (JIS No. 3 test piece) defined by JIS Z 2202.

Note that a Charpy impact value is a value of absorption energy E, as described below, that is divided by cross section (0.8 cm$^2$).

Absorption energy E=WgR (cos β−cos α)
Hammer weight W=25.438 kg
Gravitational acceleration g=9.80665 m/sec$^2$
Distance R from center of axis of rotation of hammer to center of gravity=0.6569 m
Hammer lifted by angle α=146°
Hammer moved upward and downward by angle β

(4) Measurement of Fracture Stress

Figure 13:
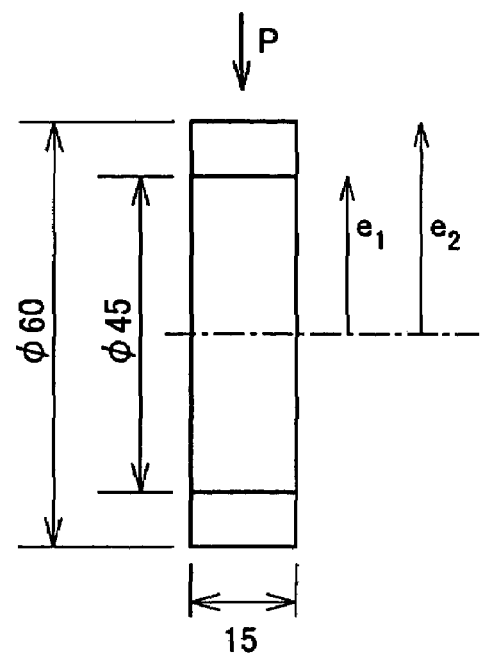
FIG. 13 shows a sample used in a static pressure fracture strength test (to measure fracture stress).

FIG. 13 shows a test piece utilized for the measurement of fracture stress. Amsler universal testing machine was employed. A load was exerted in direction P in the figure and the load when the test piece was fractured was measured. Then, the measured load which was a fracture load was converted into a stress by the following stress calculation formula for a curved beam. It is noted that the test piece to be used is not limited to the one shown in FIG. 13 and may be any test piece having a different shape.

Suppose that a fiber stress on the convex surface of the test piece shown in FIG. 13 is $\sigma_1$ and a fiber stress on the concave surface is $\sigma_2$, then, $\sigma_1$ and $\sigma_2$ are determined by the following formula (JSME Mechanical Engineer's Handbook, A4-strength of materials, A4-40). Here, N indicates an axial force of a cross section including the axis of the annular test piece, A indicates a cross-sectional area, $e_1$ indicates an outer radius, $e_2$ indicates an inner radius, and κ is a section modulus of the curbed beam.

$$\sigma_1=(N/A)+\{M/(A\rho_o)\}[1+e_1\{\kappa(\rho_o+e_1)\}]$$

$$\sigma_2=(N/A)+\{M/(A\rho_o)\}[1-e_2\{\kappa(\rho_o-e_2)\}]$$

$$\kappa=-(1/A)\int A\{\eta/(\rho_o+\eta)\}dA$$

(5) Rolling Fatigue Test

Figure 14A:
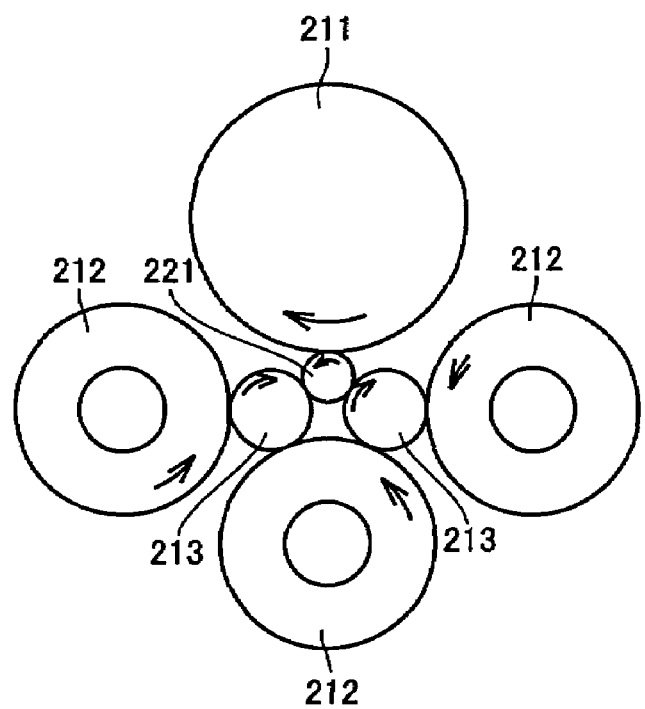
FIG. 14A is a schematic front view of a rolling contact fatigue life tester.
Figure 14B:
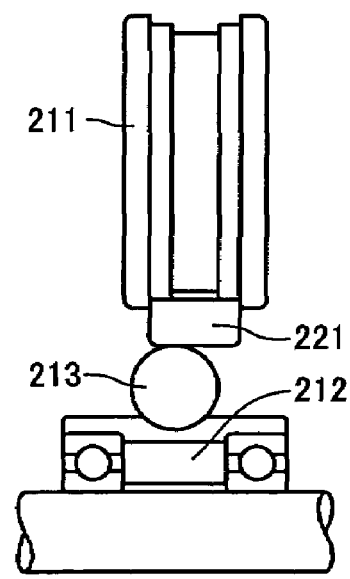
FIG. 14B is a schematic side view of the rolling contact fatigue life tester.

The rolling fatigue life tester is shown in FIGS. 14A and 14B in its simplified form, and test conditions for a rolling fatigue life test are shown in Table 2. Referring to FIGS. 14A and 14B, a test piece 221 undergoing the rolling fatigue life test was driven by a driving roll 211 to rotate while being in contact with balls 213. Balls 213 were (¾)" balls guided by a guiding roll 212 to roll. Balls 213 exerted a high surface pressure on test piece 221 while test piece 221 also exerted a high surface pressure on balls 213.

The results of the above-described measurements and tests will now be described.

(1) Amount of Hydrogen

Table 1 shows that the conventional carbonitrided sample without being additionally processed has a considerably large hydrogen amount in the steel that is 0.72 ppm. A reason therefor is considered that ammonia ($NH_3$) contained in the atmosphere in the carbonitriding process is decomposed and then hydrogen enters the steel. On the other hand, the hydrogen amount in the steel of samples B-F is reduced to 0.37-0.42 ppm and thus almost a half of that of the conventional sample. This amount of hydrogen in the steel is substantially equal in level to that of the normal quenched sample.

The above-mentioned reduction of the hydrogen amount in the steel can lessen the degree of embrittlement of the steel that is due to hydrogen in the solid solution. In other words, by the reduction of the hydrogen amount, the Charpy impact value and the fracture stress value of samples B-F of the present invention are remarkably improved.

(2) Crystal Grain Size

With reference to Table 1, regarding the crystal grain size, samples that are secondary quenched at a temperature lower than the quenching temperature in the carbonitriding process (primary quenching), namely samples B-D have austenite grains which are remarkably made fine, i.e., crystal grain size number is 11-12. Samples E and F as well as the conventional carbonitrided sample and the normal quenched sample have austenite grains with the crystal grain size number of 10, which means that the crystal grain size of samples E and F is greater than that of samples B-D.

(3) Charpy Impact Value

Table 1 shows that the Charpy impact value of the conventional carbonitrided sample is 5.33 $J/cm^2$ while those of samples B-F of the present invention are higher, ranging from 6.20 to 6.65 $J/cm^2$. It is also seen from this that a lower secondary quenching temperature leads to a higher Charpy impact value. The normal quenched sample has a high Charpy impact value of 6.70 $J/cm^2$.

(4) Measurement of Fracture Stress Value

The fracture stress corresponds to anti-crack strength. It is seen from Table 1 that the fracture stress of the conventional carbonitrided sample is 2330 MPa. On the other hand, the fracture stresses of samples B-F are improved to 2650-2840 MPa. The normal quenched sample has a fracture stress of 2770 MPa which is in the range of the fracture stress of samples B-F. It is considered that the reduction in hydrogen content greatly contributes to the improved anti-crack strength of samples B-F as well as the reduction in size of austenite crystal grains.

(5) Rolling Fatigue Test

According to Table 1, the normal quenched sample has the shortest rolling fatigue life ($L_{10}$) due to the absence of a nitriding layer in the surface layer. In contrast, the rolling fatigue life of the conventional carbonitrided sample is 3.1 times as long as that of the normal quenched sample. The rolling fatigue life of samples B-D is remarkably improved as compared with the conventional carbonitrided sample. Samples E and F have the rolling fatigue life almost equal to that of the conventional carbonitrided sample.

In summary, the hydrogen content in the steel can be reduced in samples B to F according to the present invention. Thus, the improved fracture stress and Charpy impact values can be achieved in samples B to F. In addition to these fracture stress value and Charpy impact value, the rolling contact fatigue life should desirably be improved. This can be achieved only in samples B to D having even smaller grains with an austenite grain size number of at least approximately 11. Samples B to F correspond to examples in accordance with the present invention, however, the more desirable scope of the present invention is that corresponding to samples B to D that have been subjected to the secondary quenching at a temperature lower than that applied to carbo-nitride the steel and thus has even smaller grains.

EXAMPLE 2

Example 2 of the present invention is now described.

On the following samples A, B and C, a series of tests was conducted. A material to be heat-treated that was employed commonly to samples A-C was JIS-SUJ2 (1.0 wt % of C-0.25 wt % of Si-0.4 wt % of Mn-1.5 wt % of Cr). Samples A-C were each processed through the following procedure.

Sample A—comparative example: normal quenching only (without carbonitriding)

Sample B—comparative example: quenching directly after carbonitriding (conventional carbonitriding and quenching)

Carbonitriding was conducted at 845° C. held for 150 minutes. The atmosphere in the carbonitriding process was a mixture of RX gas and ammonia gas.

Sample C—example of the present invention: A bearing material was processed following the heat treatment pattern shown in FIG. 2. carbonitriding was conducted at 845° C. held for 150 minutes. The atmosphere in the carbonitriding process was a mixture of RX gas and ammonia gas. Final quenching temperature was 800° C.

(1) Rolling Fatigue Life

Test conditions and the test device for the rolling fatigue life test are as shown in Table 2 and FIG. 7. Results of the rolling fatigue life test are shown in Table 3.

TABLE 2

| | |
|---|---|
| Test piece | φ 12 × L22 cylindrical test piece |
| Number of tested pieces | 10 |
| Counterpart steel ball | ¾" (19.05 mm) |
| Contact surface pressure | 5.88 GPa |
| Load speed | 46240 cpm |
| Lubricating oil | Turbine VG68 - forced circulation lubrication |

TABLE 3

| | Test Result | | |
|---|---|---|---|
| | Life (load Count) | | |
| Sample | $L_{10}$ (×10⁴ times) | $L_{10}$ (×10⁴ times) | Relative $L_{10}$ |
| A | 8017 | 18648 | 1.0 |
| B | 24656 | 33974 | 3.1 |
| C | 43244 | 69031 | 5.4 |

According to Table 3, carbonitrided sample B (comparative example) has a rolling fatigue life ($L_{10}$ life: one out of ten test pieces being damaged) that is 3.1 times as long as that of sample A (comparative example) which undergoes normal quenching only, and thus it is seen that the effect of extending the life is obtained through the carbonitriding process. In contrast, sample C of the present invention has a longer life which is 1.74 times as long as that of sample B and 5.4 times as long as that of sample A. It is considered that this improvement is obtained mainly from the fine microstructure.

(2) Charpy Impact Test

A Charpy impact test was conducted by using a U-notch test piece defined by JIS Z 2242 mentioned above. Test results are shown in Table 4.

TABLE 4

| | Charpy Impact Strength Test | |
|---|---|---|
| Sample | Charpy impact value (J/cm²) | Relative impact value |
| A | 6.7 | 1.0 |
| B | 5.3 | 0.8 |
| C | 6.7 | 1.0 |

Sample C of an example of the present invention achieved a Charpy impact value equal to that of sample A (comparative example) having undergone only normal quenching and higher than that of carbonitrided sample B (comparative example).

(3) Static Fracture Toughness Test

Figure 15:
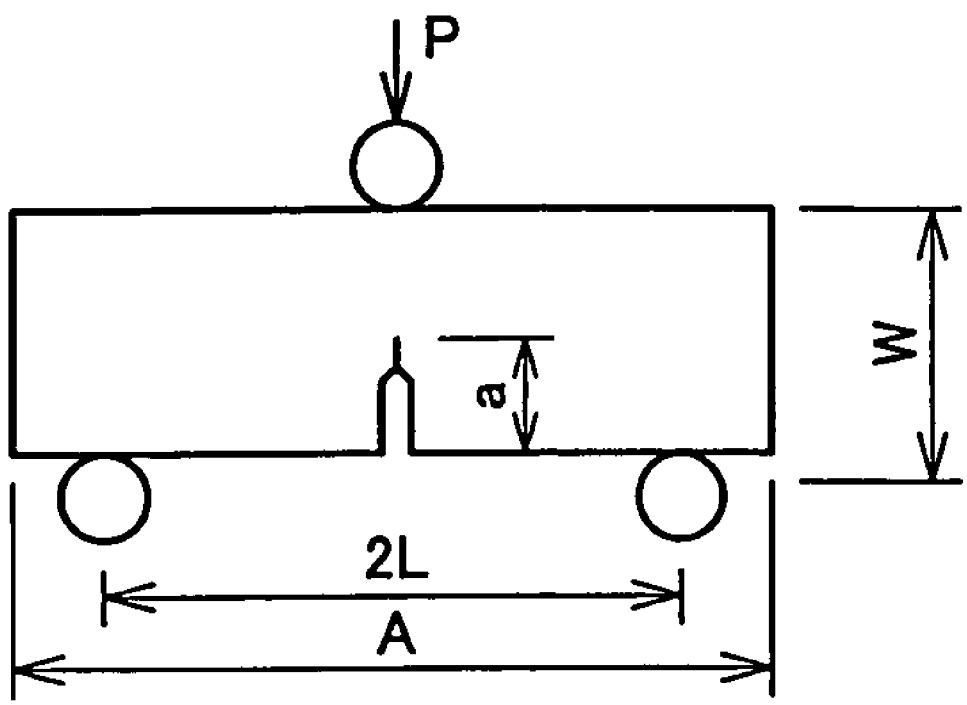
FIG. 15 shows a sample used in a static fracture toughness test.

The test piece shown in FIG. 15 was used for the static fracture toughness test. In this test piece, a pre-crack of approximately 1 mm was made, thereafter a static load P by three-point bending was added, and then a fracture load was determined. Using the following formula, a fracture toughness value ($K_{Ic}$ value) was calculated. Results of the test are shown in Table 5.

$$K_{Ic}=(PL\sqrt{a}/BW^2)\{5.8-9.2(a/W)+43.6(a/W)^2-75.3(a/W)^3+77.5(a/W)^4\}$$

TABLE 5

| Sample | Number tested | $K_{IC}$ (MPa√m) | Relative $K_{IC}$ |
|---|---|---|---|
| A | 3 | 16.3 | 1.0 |
| B | 3 | 16.1 | 1.0 |
| C | 3 | 18.9 | 1.2 |

As the previously introduced crack has a depth greater than the depth of the nitriding layer and thus the same results are obtained for samples A and B (comparative examples), while sample C (example of the present invention) achieves a fracture toughness value ($K_{IC}$ value) approximately 1.2 times as high as those of samples A and B (comparative examples).

(4) Static-Pressure Fracture-Strength Test (Measurement of Fracture Stress)

A static-pressure fracture-strength test piece as shown in FIG. 13 described above was used. A load was exerted in direction P in the figure to conduct a static-pressure fracture-strength test just as described above. Test results are shown in Table 6.

TABLE 6

| | Test Results | | |
|---|---|---|---|
| Sample | Number tested | Static fracture strength (kgf) | Relative static fracture strength |
| A | 3 | 4200 | 1.00 |
| B | 3 | 3500 | 0.84 |
| C | 3 | 4300 | 1.03 |

Carbonitrided sample B (comparative example) has a value of a static-pressure fracture-strength slightly smaller than that of sample A (comparative example) having been subjected to normal quenching alone. In contrast, sample C of an example of the present invention has a static-pressure fracture-strength value considerably higher than that of sample B and slightly higher than that of sample A.

(5) Rate of Secular Dimensional Variation

Table 7 shows the rate of secular dimensional variation measured under the conditions of 130° C. (holding temperature) and 500 hours (holding time), together with the surface hardness and the amount of retained austenite (at 0.1 mm depth from the surface).

TABLE 7

| Sample | Number tested | Surface hardness (HRC) | Retained γ (%) | Rate of dimensional change (×10⁻⁵) | Relative rate of dimensional change*) |
|---|---|---|---|---|---|
| A | 3 | 62.5 | 9.0 | 18 | 1.0 |
| B | 3 | 63.6 | 28.0 | 35 | 1.9 |
| C | 3 | 60.0 | 11.3 | 22 | 1.2 |

*)smaller is superior

As compared with the rate of dimensional variation of sample B having a large amount of retained austenite, sample C of an example of the present invention has a lower rate of dimensional variation.

(6) Life Test Under Contaminated Lubricant Condition

Ball bearing 6206 was used to evaluate the rolling fatigue life under a contaminated lubricant condition having a predetermined amount of normal contaminants mixed therein. Test conditions are shown in Table 8 and test results are shown in Table 9.

TABLE 8

| | |
|---|---|
| Load | Fr = 6.86 kN |
| Contact surface pressure | Pmax = 3.2 Gpa |
| Rate of rotation | 2000 rpm |
| Lubricant | Turbine 56 - oil bath lubrication |
| Amount of contaminant | 0.4 g/1000 cc |
| Contaminant | Grain size: 100-180 μm, hardness: Hv800 |

TABLE 9

| Sample | $L_{10}$ life (h) | Relative $L_{10}$ |
|--------|-------------------|-------------------|
| A | 20.0 | 1.0 |
| B | 50.2 | 2.5 |
| C | 74.0 | 3.7 |

Sample B (comparative example) having undergone carbonitriding has a lifetime which is approximately 2.5 times as long as that of sample A, and sample C of the present invention has a lifetime which is approximately 3.7 times as long as that of sample A. While sample C of the present invention has a smaller amount of retained austenite than that of sample B of the comparative example, sample C has a long lifetime because of influences of entering nitrogen and the fine microstructure.

It is accordingly seen from the above-discussed results that, sample C of the present invention, namely a bearing component serving as a support structure in a transmission produced by the heat treatment method of the present invention can simultaneously achieve three goals: extension of the rolling fatigue life that has been difficult to achieve by the conventional carbonitriding, improvement in crack strength and reduction of the rate of secular dimensional variation.

Note that in this specification the austenite grains refer to crystal grains of austenite which is phase-transformed during the heating process, and the traces of grains remain after the austenite is transformed into martensite through cooling.

In the transmission component and the method of manufacturing the same and the tapered roller bearing according to the present invention, the nitriding layer is formed and in addition, a superior fracture stress value not heretofore achieved can be obtained. Therefore, the anti-crack strength or the like can be improved in the present invention. Additionally, the transmission can be downsized.

Although the present invention has been described and illustrated in detail, it is clearly understood that the same is by way of illustration and example only and is not to be taken by way of limitation, the spirit and scope of the present invention being limited only by the terms of the appended claims. For example, the needle roller bearing may be a full type roller bearing or a shell type needle roller bearing.

What is claimed is:

1. A transmission component incorporated into a transmission capable of changing a rotational speed of an output shaft relative to a rotational speed of an input shaft by means of mesh of toothed wheels, said component having a nitriding layer formed by a carbonitriding process at a surface layer, a fracture stress value of at least 2650 MPa, an austenite grain with a grain size number of 11 or greater, and a non-diffusible hydrogen content of at most 0.5 ppm.

2. The transmission component according to claim 1, provided in a form of a rolling bearing rotatably supporting said input shaft, said output shaft, or each of said toothed wheels, said rolling bearing being a tapered roller bearing.

3. The transmission component according to claim 1, provided in a form of a rolling bearing rotatably supporting said input shaft, said output shaft, or each of said toothed wheels, said rolling bearing being a needle roller bearing.

4. The transmission component according to claim 1, provided in a form of a rolling bearing rotatably supporting said input shaft, said output shaft, or each of said toothed wheels, said rolling bearing being a ball bearing.

5. A tapered roller bearing having an inner ring, an outer ring, and a tapered roller, wherein at least any one of said inner ring, said outer ring and said tapered roller has a nitriding layer formed by a carbonitriding process, a fracture stress value of at least 2650 MPa, an austenite grain with a grain size number of 11 or greater, and a non-diffusible hydrogen content of at most 0.5 ppm.

6. The transmission component according to claim 1, wherein said component is formed of JIS-SUJ2 steel.

* * * * *